US011578268B1

(12) United States Patent
Hubbs et al.

(10) Patent No.: US 11,578,268 B1
(45) Date of Patent: Feb. 14, 2023

(54) MALLEABLE SURFACE MATERIAL

(71) Applicants: Jonathan W. Hubbs, Phoenix, AZ (US); Clayton D. Hubbs, Phoenix, AZ (US)

(72) Inventors: Jonathan W. Hubbs, Phoenix, AZ (US); Clayton D. Hubbs, Phoenix, AZ (US)

( * ) Notice: Subject to any disclaimer, the term of this patent is extended or adjusted under 35 U.S.C. 154(b) by 5 days.

(21) Appl. No.: 17/106,447

(22) Filed: Nov. 30, 2020

Related U.S. Application Data

(63) Continuation-in-part of application No. 15/867,246, filed on Jan. 10, 2018, now Pat. No. 10,851,300.

(60) Provisional application No. 62/444,865, filed on Jan. 11, 2017.

(51) Int. Cl.
*C09K 17/42* (2006.01)
*E01C 13/06* (2006.01)
*E01C 11/00* (2006.01)

(52) U.S. Cl.
CPC ............ *C09K 17/42* (2013.01); *E01C 11/005* (2013.01); *E01C 13/06* (2013.01)

(58) Field of Classification Search
None
See application file for complete search history.

(56) References Cited

U.S. PATENT DOCUMENTS 6,027,557 A * 2/2000 Hayner .................. C08L 95/00 106/279
6,821,332 B2 * 11/2004 Hubbs .................. C09K 17/40 106/272
7,160,379 B1 * 1/2007 Shoshany .............. C08L 91/06 106/272

* cited by examiner

*Primary Examiner* — Stefanie J Cohen
(74) *Attorney, Agent, or Firm* — Venjuris, P.C.

(57) ABSTRACT

An improved surface material is particularly suited for non-turf baseball field applications such as the pitcher's mound and base paths. The material generally comprises clay, wax, Foots oil and sand and has a putty-like consistency. Cleats can penetrate the material but are not likely to pull it out in clumps upon removal of the cleats. Method for forming the surface includes pre-coating the soil with Foots oil and then spraying an emulsified wax on a surface and mixing it with the surface material.

5 Claims, No Drawings

MALLEABLE SURFACE MATERIAL

CROSS-REFERENCE TO RELATED APPLICATIONS

This application claims benefit of U.S. Provisional Application No. 62/444,865 filed Jan. 11, 2017 and U.S. patent application Ser. No. 15/867,246 filed Jan. 10, 2018.

BACKGROUND OF THE INVENTION

Field of the Invention

The present invention relates to an improved malleable surface material comprising clay, wax and Foots oil, and a method of making the improved surface material and surface made by the method.

Description of the Prior Art

Athletic fields are special type of ground surface. For the most part, athletic fields are covered by one of three types of surfaces: natural grass, synthetic grass or clay. Typical clay surfaces found on athletic fields include pitcher's mounds, base paths, batter's boxes and warning tracks. Other clay surfaces include horse tracks. Each of these clay surfaces need to stay within a certain range of pliability: i.e., not so soft that the surface cannot support its players, and not so hard that the soil does not deform at all under player load.

For example, when a pitcher throws a pitch his leading foot moves forward and presses down upon the soil on the front portion of the mound. His trailing foot also lands on this front portion of the mound. After throwing a pitch, the pitcher returns to the rubber portion of the mound. The impact of the pitcher's feet upon the soil and removal of his cleats can create divots or depressions or otherwise deform the surface of the soil. Often the pitcher and/or the ground crews work to adjust or correct the consistency or level of the surface where the pitcher lands after throwing a pitch. A putty-like surface is ideal for a pitcher's mound.

While several methods and products are known for conditioning or treating soil to improve playability, the best way to create a soil with putty-like consistency is to mix wax, clay, and a combination of sand, silt and crushed aggregate. Preferably, the soil mixture is about 50-62% crushed aggregate, 25-31% clay and 7-25% wax. Information about how to make and use this malleable surface material is described in U.S. Pat. No. 6,821,332 to J. W. Hubbs and incorporated herein by reference. This mixture can be adjusted to create a stiffer or softer soil surface as needed.

While adding wax to soil has been found to offer many playability benefits to the soil, this soil can become harder over time, especially during the colder times of the year in the United States. For example, ball fields in the northeastern part of the United States that have soil comprising wax and clay tend to harden over time, and particularly so from late fall to early spring.

There remains a need to improve the malleability/playability of a soil comprising wax and clay so that it retains its malleability/playability over time as well as in colder temperatures.

As used herein, the term "soil" refers to any particulate material of the earth, such as one or more of clay, sand, silt and/or crushed aggregate/decomposed granite, whether or not it contains organic matter.

The term "clay" refers to any (1) inorganic earth surface material that is plastic when moist but hard when fired and that is comprised primarily of hydrous aluminum silicates and other minerals, or (2) substance having the properties of clay. Clay includes dry and wet clay and may or may not include organic matter.

The term "sand" means a loose granular material formed by the disintegration of rocks to form particles smaller than gravel but coarser than silt. Sand may or may not include organic matter. The term "silt" means loose, unconsolidated sedimentary material with rock particles usually {fraction (1/20)} millimeter or less in diameter and being generally smaller than sand but coarser than clay. Silt may or may not include organic matter.

As used herein, the term "decomposed granite" or "crushed aggregate" means granite rock decomposed into smaller particles, some of which have the consistency of silt and some of which have the consistency of sand. Decomposed granite and/or crushed aggregate may or may not include organic matter.

As used herein, the term "wax" means any solid (at room temperature), heat-sensitive substance comprised primarily of high molecular weight hydrocarbons or esters of fatty acids that are generally insoluble in water.

The term "emulsified" means to form an emulsion. As used herein, "emulsion" means a fluid formed by the suspension of (1) wax particles in a liquid, particularly water, or (2) liquid wax in another liquid, particularly water.

The term "alkane" means an acyclic saturated hydrocarbon consisting of hydrogen and carbon atoms arranged in a tree structure, with single carbon-carbon bonds. Alkanes have the general chemical formula $C_nH_{2n+2}$. Well-known alkanes include methane, ethane, propane, butane, pentane, hexane. Those in the art are familiar with other alkanes and isomers.

The term "Foots oil" means a paraffinic wax with low aromatic content, good oxidation stability, and high viscosity/temperature behavior. Foots oil is generally liquid at room temperature.

BRIEF SUMMARY OF THE INVENTION

The invention is an improved surface material used to form an improved surface, a method for forming the improved surface material, and an improved surface utilizing the surface material. The surface material is particularly suited for use in an application where the surface should be (1) firm, and (2) malleable enough (a) to allow for the penetration of cleats, (b) to allow for relatively easy repair, and (c) to resist being pulled out in clumps, thereby creating divots, upon removal of the cleats. The surface material can preferably be refinished without adding water (although water can be added), is relatively dust free and water resistant. The surface material of the invention is preferably a mixture of wax, clay, Foots oil, and crushed aggregate, and/or sand having the above-mentioned attributes. Any surface material having suitable physical properties, however, may be used. One example of another material is soy oil.

The surface material of the invention functions by providing an improved surface. The manner in which it performs this function is by providing a mixture comprising wax, clay, Foots oil and preferably some sand or crushed aggregate. The result is a surface that cleats can penetrate, but that resists having divots pulled out of it when the cleats are removed. And the surface retains these features over time and under colder temperatures. The method of the invention functions to treat one or more materials, such as clay, sand, silt, soil and/or crushed aggregate to form a surface material.

The way in which it treats the material(s) is by adding wax and Foots oil. The result is a malleable surface material that cleats can penetrate, but that resists having divots pulled out of it when the cleats are removed.

The invention also includes a method of adding Foots oil to a material including some combination of clay, wax, sand, silt, soil and/or crushed aggregate. The result is that a malleable surface material is formed.

In addition to functioning in the manner described and producing the results described, a surface according to the invention preferably provides the following benefits over time and under colder temperatures (i.e., ambient outside temperature in the range of 35°–65° F.): (1) little or no need to water it to reduce dust or to maintain the surface at the proper consistency, (2) relatively good water resistance so that it does not get muddy, (3) cohesiveness and malleability for relatively easy repair, (4) more binding ability in higher traffic areas.

DESCRIPTION OF PREFERRED EMBODIMENTS

A mixture according to the invention includes wax, clay and Foots oil and optionally one or more of sand, silt and crushed aggregate. The preferred mixture includes between about 50-62% crushed aggregate, between about 25-31% clay and between about 7-25% wax and 2-20% Foots oil. These percentages are by weight. However, any surface material having the appropriate physical properties, as set forth herein, could be used to practice the invention.

Most any clay can be used to practice the invention and the clay could either be dry or moist. The purpose of the clay is to provide particles that are cohesive when wetted (such as by a wax) to form a malleable, and sufficiently firm, surface material.

Among the waxes that may be used to practice the invention is IGI 422. IGI 422 is a microcrystalline-based slack wax. It has the tackiness and flexibility that are common with some grades of microcrystalline waxes. It is recommended for use as a coating or for impregnating for waterproofing, sweeping compounds, metal protection, lubricating, polishing, and tanning.

The preferred foots oil to be used in the invention is StaLok 0211A sold by Stabilizer Solutions, LLC of Phoenix, Ariz. While this is not the only Foots oil that could be used, it is the most preferred. Its properties include:

- Physical State: Solid
- Form: Soft Solid
- Color: Off-white to Brown
- Odor: Petroleum
- Odor Threshold: No data available
- pH: Not applicable
- Melting point/freezing point: 86-194° F. (30-90° C.)
- Initial boiling point and boiling range: >572° F. (>300° C.)
- Flash point: >302.0° F. (>150.0° C.) ASTM D-93
- Evaporation rate: <0.01 (Butyl acetate=1)
- Flammability (solid, gas): Will support a flame above flashpoint A surface material according to the invention preferably includes sand or another material, such as crushed aggregate, that includes sand particles or particles that perform the same function as sand in the surface material. The sand is believed to help aggregate the surface material; it makes the surface material harder and able to support a greater load (i.e., the surface material is more load bearing). The addition of too much sand could make the surface material too grainy or brittle, and/or lead to a material that does not compact well and that is not sufficiently malleable. Without sufficient sand the surface material may be too soft and lack sufficient compressive strength.

Virtually any crushed aggregate or decomposed granite having sand particles may be used, including ¼" D.G. or D.G. finely screened to 2 mil size. Decomposed granite was used in the samples described herein. For example, a suitable decomposed granite and clay mix would have the following properties:

| Sieve Analysis | |
|---|---|
| Sieve Size | % Passing |
| #10 | 100 |
| #16 | 97.4 |
| #40 | 77.8 |
| #100 | 56.8 |
| #200 | 48.2 |

| Hydrometer |
|---|
| Passing 0.02 mm = 40.0% |
| Passing 0.002 mm = 10.0% |
| #Passing 0.001 mm = 2.0% |

A surface material according to the invention may include one or more organic binders, such as dried and ground plantago (also known as "psyllium") or dried and ground guar. The organic binder typically exhibits a swell volume (an increase in volume when it has absorbed its capacity in water) in the range of 25%-45% and preferably about 35%. Other binders, either organic or inorganic, may be utilized. The amount and type of binder included (if any) is chosen to provide the desired binding of the soil particles. The binder may be added in any manner, including bucket blending, belt blending hand tilling, or a surface application, each of which are known by people skilled in the art of manufacturing conditioned soil product. The binder may be added when the Foots oil is mixed with other ingredients to form a surface material, or at another time. The preferred surface material comprises wax and Foots oil of a type to make the surface material malleable and to add cohesiveness between the particles and clay and preferably has the following properties: a dry density of between 100 and 115 lbs/ft$^3$; and an unconfined compressive strength of between 10 and 100 psi, wherein there is not brittle failure of the surface material.

For use with soil that has already been placed, Foots oil can be sprayed on the surface of the soil at a preferred rate of 1 gallon per 10-50 square feet. Most any standard spray machine or water truck known in the art will work. The Foots oil should be heated to 125 F to properly flow through spraying equipment. After spraying the surface, the Foots oil can be allowed to penetrate and be absorbed into the soil. Or, after spraying the surface of the soil, the top inch or two must be tilled in situ.

The addition of the Foots oil is completed at the same time as the wax coating. The preferred results are achieved when the wax is heated and free flowing at 200 F. The Foots oil can be used to supplement or alter the wax properties when blended prior to the wax cooling when mixed with soil.

The materials may be mixed in any manner to form a surface material according to the invention, including bucket mixing using a front-end loader, hand or machine tilling, or using a concrete mixer. Preferably, the wax and/or other ingredients are heated prior to or during the mixing step. Water or other materials, such as gravel, silt, organic binder or other organic materials, may be added to, or be present in, the mixture and may be present in the finished surface product. The method used to make the samples described herein that include wax was to place the materials in a concrete mixer and add the wax at a temperature between 150° F. and 200° F. and mix until the mixture appeared wetted, or moist, and little dust was observed. The mixing appeared to be more efficient the closer the wax was to 200° F.

Additionally, the wax may be provided in an emulsion such as an emulsion with water, the procedure for making such an emulsion being known to persons skilled in the art of emulsifying materials such as wax. The emulsion can then be stored and/or shipped in any suitable containers, such as cans, tanks or drums. The emulsion can be added to soil, clay, sand, silt and/or crushed aggregate in any fashion, such as by pouring or spraying it onto a surface, or by adding it to a mixer (such as a concrete mixer) including the soil, clay, silt, sand and/or crushed aggregate. The emulsion can then be mixed, using any method, with other materials to form a surface material according to the invention. Among the mixing methods that may be used are bucket blending, using a concrete mixer, hand tilling or machine tilling. Water may be added before or during mixing, although the water in the emulsion should be adequate to make the material easy to mix. The resulting surface material, which is a mixture of the emulsified wax, soil, sand, silt, clay and/or crushed aggregate, may then be dried (as may any surface material that includes water) by any suitable method, such as open air drying or forced air-drying, prior to being applied to a surface. Alternatively, if the surface material is already on the surface or is placed on a surface before being dried, it may be dried in any manner, including the methods discussed above. A surface material including water may also be dried in stages. For example, it may be dried prior to being applied to a surface to remove some water and then be dried to remove more water after being applied to the surface.

The advantage of using emulsified wax is that the wax and/or other materials mixed to form a surface material according to the invention need not be heated to mix them efficiently. Additionally, the emulsified wax could be provided in small or large containers and applied to a surface (such as by spraying) with relative ease. Therefore, lay persons could easily use the product to form a surface material and surface according to the invention, either by spraying the wax onto a surface and then mixing it with the surface soil, or by first adding a layer, such as soil, clay, or a clay-crushed aggregate mix, and then spraying the emulsified wax over the layer and mixing the two. Furthermore, if the emulsified wax had the right properties, including as a relatively low viscosity, it could be added to a surface and soak in to treat it and form a surface material according to the invention, thereby eliminating the mixing step. But, the surface would still preferably be compressed, as described below.

The surface material may be applied to a surface in any manner, such methods applying surface material being known to those skilled in the art. Generally, the material would be placed upon the surface, using any method, at a desired depth and compressed, using any method, prior to use. It may also be graded, raked, watered and/or dried prior to use.

A surface layer utilizing the invention can be any depth and would generally be between 2" and 6" depending upon the application. For example, a layer of about 6" in depth could be used for pitcher's mounds or equestrian racing tracks. A layer on a base path could be between ¼" and 3" deep. Any surface can utilize the invention, especially non-turf surfaces such as baseball infields, soccer fields, hand ball courts, tennis courts, horse training, exercising, jumping and racing surfaces, parking lots, highway berms and embankments, outdoor trails, and sand bunker liners.

Surface material according to the invention can be repaired in many ways, including by (1) compressing or molding it with a hand tool, (2) raking it, (3) adding additional surface material to an area to be repaired, or (4) any combination of (1)-(3). Additionally, some water may be added to the surface material when making repairs in order to make the surface material even more malleable. Additionally, repairs may be made utilizing rollers or tools that provide heat to soften the wax. Such rollers or tools may provide heat to the roller or tool or directly to the surface material, and may include a hot air blower to provide the heat. Further, a separate hot air blower could heat the surface material before or during repairs.

Having now described preferred embodiments of the invention variations that do not depart from the spirit thereof may become apparent to others. The invention is thus not limited to the preferred embodiments but is instead set forth in the following claims and legal equivalents thereof. Unless stated otherwise in the claims, method steps may be performed in any order capable of providing a result according to the invention.

The invention claimed is:

1. A surface material comprising:

a) 1-30% clay particles;

b) 30-80% crushed aggregate particles;

c) 10-40% wax of a type to make the surface material malleable and to add cohesiveness between the clay particles and the crushed aggregate particles; and d) Foots oil.

2. The surface material of claim 1, further comprising a binder.

3. The surface material of claim 2, wherein the binder is plantago.

4. A surface material comprising particles made by the method of mixing clay with emulsified wax and Foots oil of a type to make the surface material malleable and to add cohesiveness between the particles.

5. A surface material comprising clay, wax and Foots oil of a type to make the surface material malleable and to add cohesiveness to the clay and having the following properties:

a) a dry density of between 100 and 115 lbs/ft; and b) an unconfined compressive strength of between 10 and 100 psi, wherein there is not brittle failure of the surface material.

* * * * *